United States Patent
Römer et al.

(10) Patent No.: US 10,434,901 B2
(45) Date of Patent: Oct. 8, 2019

(54) ADJUSTMENT ARRANGMENT FOR ADJUSTING A VEHICLE SEAT COMPONENT AND METHOD FOR PRODUCING AN ADJUSTMENT ARRANGEMENT

(71) Applicant: FAURECIA AUTOSITZE GMBH, Stadthagen (DE)

(72) Inventors: Bernd Römer, Stadthagen (DE); Nicolas Navatte, Condé-sur-Noireau (FR); Tomasz Królik, Tarnowskie Góry (PL)

(73) Assignee: FAURECIA AUTOSITZE GMBH, Stadthagen (DE)

( * ) Notice: Subject to any disclaimer, the term of this patent is extended or adjusted under 35 U.S.C. 154(b) by 14 days.

(21) Appl. No.: 15/879,534

(22) Filed: Jan. 25, 2018

(65) Prior Publication Data
US 2018/0222348 A1    Aug. 9, 2018

(30) Foreign Application Priority Data
Feb. 9, 2017    (DE) .................. 10 2017 102 535

(51) Int. Cl.
*B60N 2/02*    (2006.01)
*B60N 2/225*    (2006.01)

(52) U.S. Cl.
CPC ......... *B60N 2/0232* (2013.01); *B60N 2/2252* (2013.01); *B60N 2002/0236* (2013.01)

(58) Field of Classification Search
CPC ............................ B60N 2/0232; B60N 2/2252
USPC ....................................................... 297/362.11
See application file for complete search history.

(56) References Cited

U.S. PATENT DOCUMENTS

| | | | | |
|---|---|---|---|---|
| 6,331,034 B1 * | 12/2001 | Specht | ................ | B60N 2/0232 297/362.11 X |
| 8,434,823 B2 * | 5/2013 | Du | ........................ | B60N 2/2252 297/354.12 |
| 8,783,774 B2 * | 7/2014 | Berres | ................... | B60N 2/0232 297/361.1 |
| 2007/0126272 A1 * | 6/2007 | Deptolla | ................ | B60N 2/206 297/362.11 |

FOREIGN PATENT DOCUMENTS

| DE | 19822649 C1 | 11/1999 |
|---|---|---|
| DE | 112013003092 T5 | 3/2015 |

OTHER PUBLICATIONS

German Office Action for DE 10 2017 102 535.9, dated Oct. 12, 2017, 601-673 DE, 9 pages.

\* cited by examiner

*Primary Examiner* — Anthony D Barfield
(74) *Attorney, Agent, or Firm* — Barnes & Thornburg LLP

(57) ABSTRACT

An adjustment arrangement for adjusting a vehicle seat component of a vehicle seat comprises an adjusting mechanism for adjusting the vehicle seat component and an electrical drive device. The electrical drive is coupled to the adjusting mechanism for the electrical actuation of the adjusting mechanism.

12 Claims, 7 Drawing Sheets

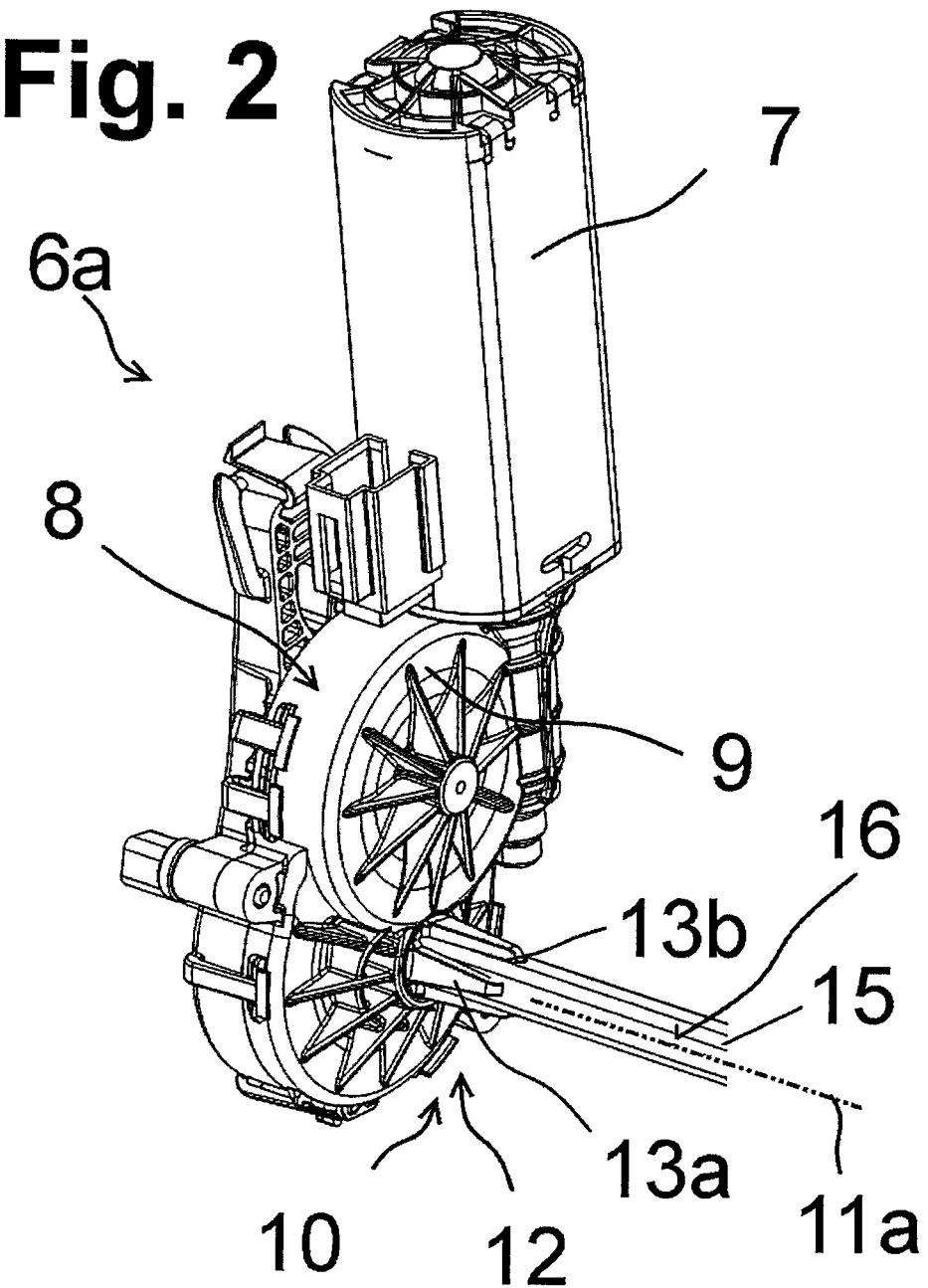

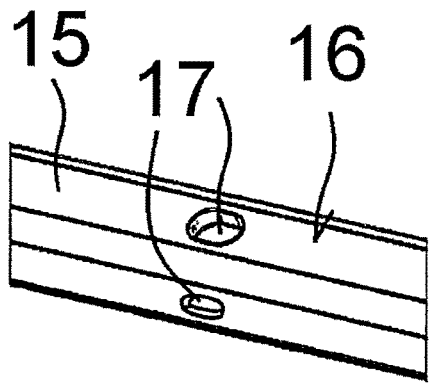
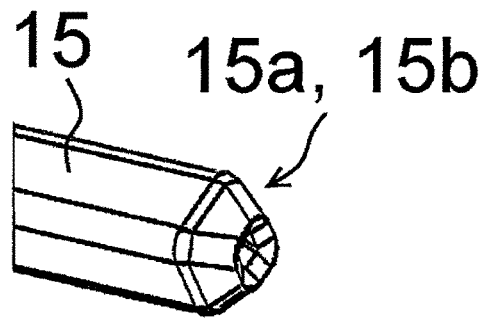
Fig. 4a   Fig. 4c
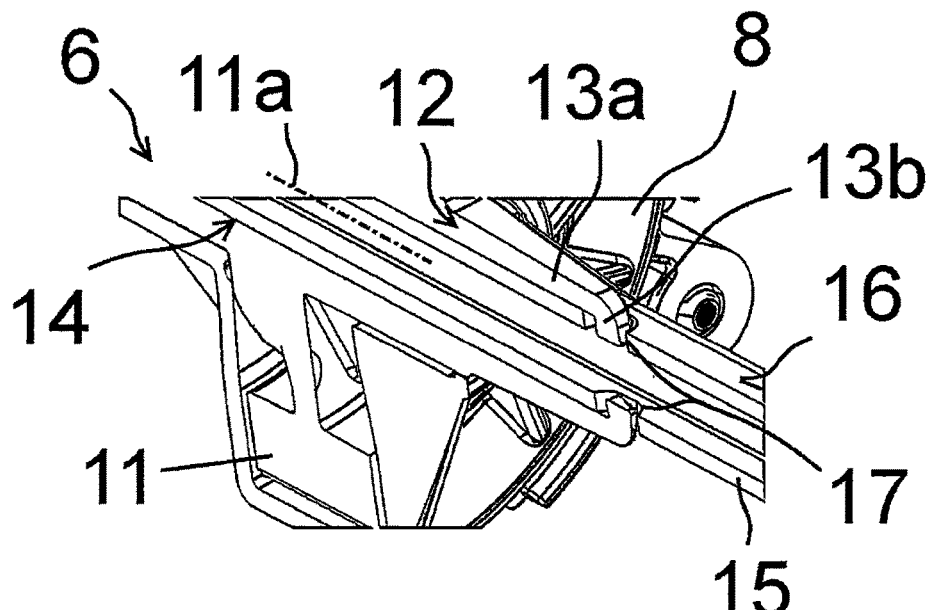
Fig. 4b

ADJUSTMENT ARRANGMENT FOR ADJUSTING A VEHICLE SEAT COMPONENT AND METHOD FOR PRODUCING AN ADJUSTMENT ARRANGEMENT

PRIORITY CLAIM

This application claims priority to German Patent Application No. DE 10 2017 102 535.9, filed Feb. 9, 2017, which is expressly incorporated by reference herein.

BACKGROUND

The present disclosure relates to an occupant support, and particularly to an occupant support used in a vehicle. More particularly, the present disclosure relates to an adjustment arrangement for a vehicle seat and a method of producing the same.

SUMMARY

According to the present disclosure, an adjustment arrangement for adjusting a vehicle seat component of a vehicle seat includes an adjusting mechanism adapted to adjust a vehicle seat component and an electrical drive device connected operatively to the adjusting mechanism for electrical actuation of the adjusting mechanism.

In illustrative embodiments, the adjustment arrangement further includes a transmission rod. The transmission rod is coupled for rotation to the adjusting mechanism for transmitting a rotational movement about an output axis from the electrical drive device through the transmission rod to the adjusting mechanism, In illustrative embodiments, the adjustment arrangement further includes a resilient adjusting latching element. The resilient adjusting latching element is arranged between the transmission rod and the adjusting mechanism and is configured to block lateral movement of the transmission rod.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 2 shows a detailed view of the adjustment arrangement according to FIG. 1;

FIG. 4a is a partial perspective view showing one portion of a transmission rod;

FIG. 4b is a partial perspective view showing another portion of the transmission rod of FIG. 4a;

FIG. 4c is a partial perspective view showing another portion of the transmission rod of FIGS. 4a and 4b;

DETAILED DESCRIPTION

Figure 1:
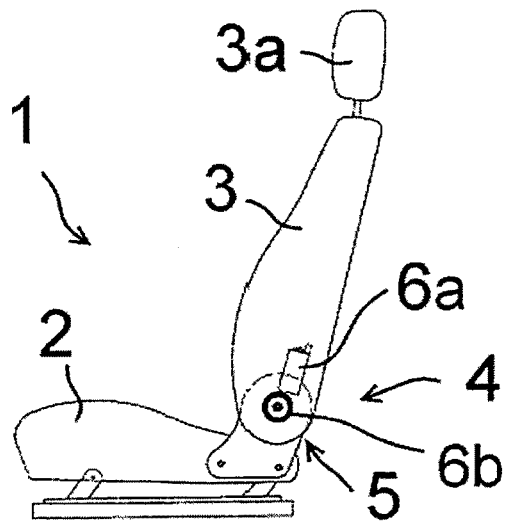
FIG. 1 shows a vehicle seat with an adjustment arrangement.

A vehicle seat 1 is shown with a seat part 2 and a backrest 3, the vehicle seat being able to be adjusted via an adjustment arrangement 4 using any adjusting mechanism 5 as suggested in FIG. 1. According to this exemplary embodiment, the adjusting mechanism 5 enables an inclination of the backrest 3 to be set relative to the seat part 2. For actuating the adjusting mechanism 5 an electrical drive device 6 is provided in the adjustment arrangement 4, the electrical drive device being fastened, for example, to the inside and non-visibly to the seat frame of the backrest 3 and being operatively connected to the adjusting mechanism 5.

However, other adjusting mechanisms are also conceivable, such as for example a height adjustment of the vehicle seat 1, an inclination adjustment of the seat part 2, or a height adjustment of a head restraint 3a of the vehicle seat 1, wherein the adjustment arrangement 4 may then be displaced into the corresponding position.

According to FIG. 2, the electrical drive device 6 has a motor 7 and a gear mechanism 8, wherein the gear mechanism 8 is received in a protective manner in a housing 9. The rotational movement produced by the motor 7 is transmitted via the gear mechanism 8 to an output side 10 of the electrical drive device 6 and decoupled there. To this end, an output gearwheel 11, shown in detail in FIGS. 3a and 3b, which is part of the gear mechanism 8, is integrally connected to an output latching element 12. The output latching element 12 is integrally produced with the output gearwheel 11 but may also be produced separately and positioned in a suitable manner onto the output gearwheel 11 and connected thereto non-positively or positively.

As a result, a movement of the motor 7 is also transmitted via the gear mechanism 8, via the output gearwheel 11, to the output latching element 12. The output latching element 12 is formed from four resilient projections 13a, each having one respective lug 13b, wherein the lugs 13b are axially aligned inwardly in the direction of an output axis 11a, the output gearwheel 11 rotating about the output axis.

Figures 3A, 3B:
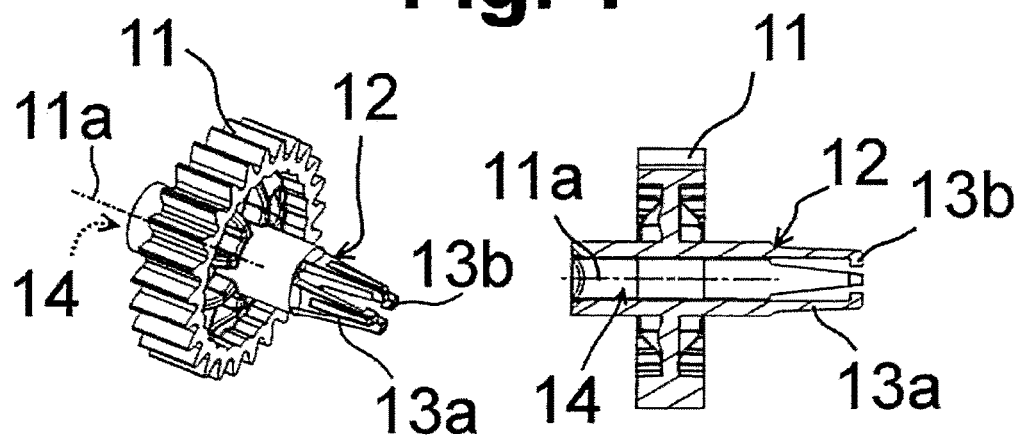
FIG. 3a is a perspective view of the adjustment arrangement in a connecting region.
FIG. 3b is an side elevation view of the adjustment arrangement of FIG. 3a with portions broken away.
Figure 3C:
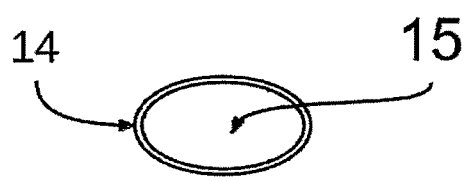
FIG. 3c is a view showing a portion of the adjustment arrangement.

A cuboidal receiver 14 is provided in the output gearwheel 11 according to FIG. 3b, the output axis 11a extending through the cuboidal receiver. According to FIG. 2, a similarly substantially cuboidal, chamfered transmission rod 15 of slightly smaller dimensions is inserted into the cuboidal receiver 14, so that the transmission rod protrudes on both sides from the output gearwheel 11. By the cuboidal shape, the transmission rod 15 is received fixedly in terms of rotation on the output side 10 of the electrical drive device 6, so that by a rotational movement of the motor 7 a rotation of the transmission rod 15 is also effected.

According to FIG. 4a, in each case an opening 17 is provided in the transmission rod 15 on the side surfaces 16 thereof, on the side surfaces 16 thereof, the lugs 13b of the output latching element 12 being automatically engaged into the opening, due to the resilience of the projections 13a, as soon as the transmission rod 15 has been inserted into the cuboidal receiver 14 along a specific path, according to FIG. 4b. Thus, in addition to a rotation, by means of the cuboidal shape a lateral displacement and/or slippage of the transmission rod 15 in the direction of the output axis 11a is also blocked by the output latching element 12 and the transmission rod 15 is secured against inadvertently slipping out. Only when the projections 13a are again bent-back outwardly in a resilient manner, for example during dismantling, is the transmission rod 15 able to be removed again from the cuboidal receiver 14 as soon as the lugs 13b move out of the openings 17. The transmission rod 15 according to FIG. 4a is pointed at the ends 15a, 15b in order to ensure mounting without the use of tools.

Figure 5A:
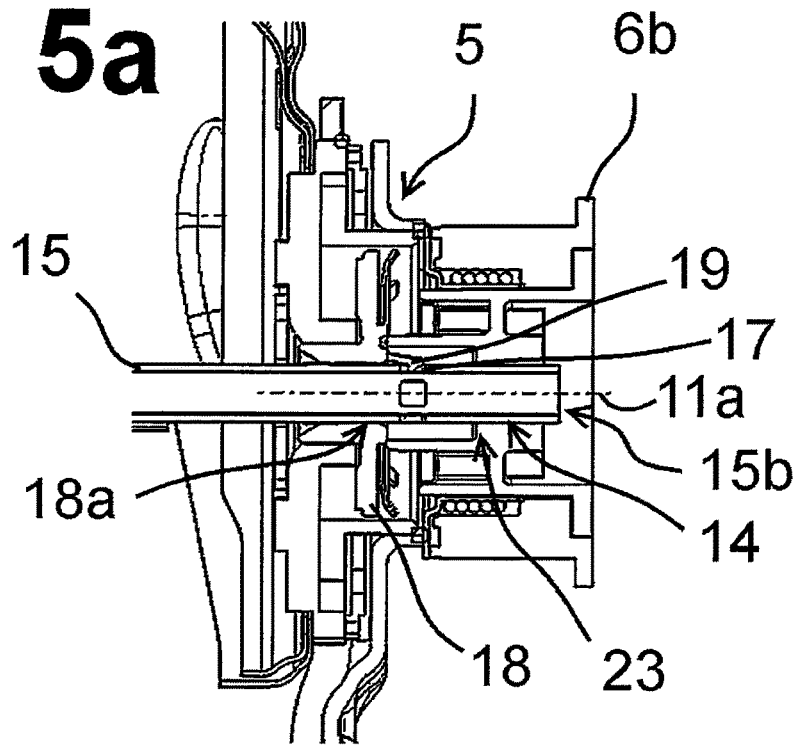
FIG. 5a shows exemplary latching elements of the adjustment arrangement.
Figure 5B:
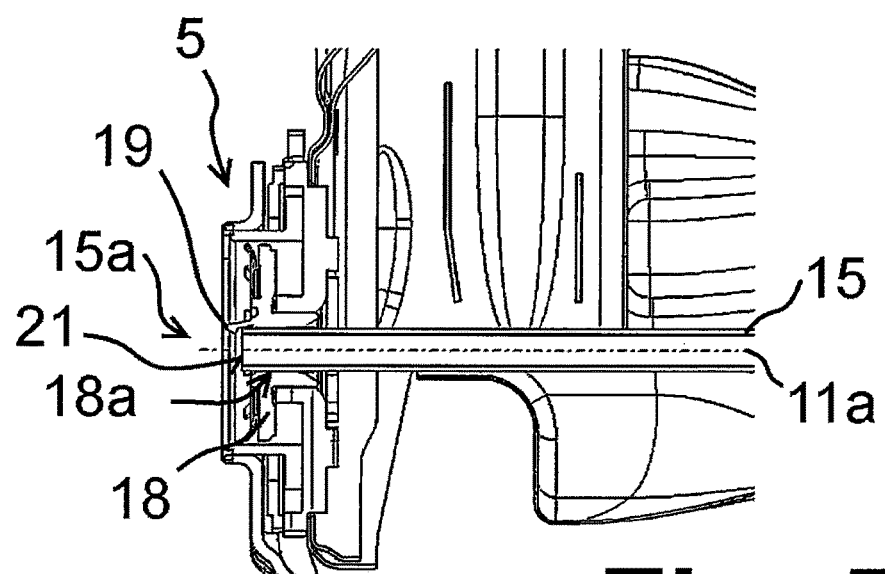
FIG. 5b shows exemplary latching elements of the adjustment arrangement.

According to FIGS. 5a, 5b the ends 15a, 15b of the transmission rod 15 are received fixedly in terms of rotation on both sides of the vehicle seat 1 in a disk 18 of the adjusting mechanism 5 in order to transfer a rotational movement, which is transmitted from the electrical drive device 6 onto the transmission rod 15, to the adjusting mechanism 5. The torsional strength in this case is achieved by a cuboidal through-opening 18a in the disk 18 which actuates the adjusting mechanism 5, so that the rotational movement may be converted into a corresponding inclination adjustment. The cuboidal through-opening 18a in this case is aligned with the cuboidal receiver 14 so that the transmission rod 15 may be easily inserted into the through-opening and receiver.

The adjusting mechanism in this case 5 is arranged on both sides of the vehicle seat 1 in order to be able to effect a uniform inclination adjustment by means of a suitable transmission of force. This is achieved by the transmission rod 15 which simultaneously transmits an actuation by the electrical drive device 6 to the adjusting mechanisms 5 on both sides.

Figure 6A:
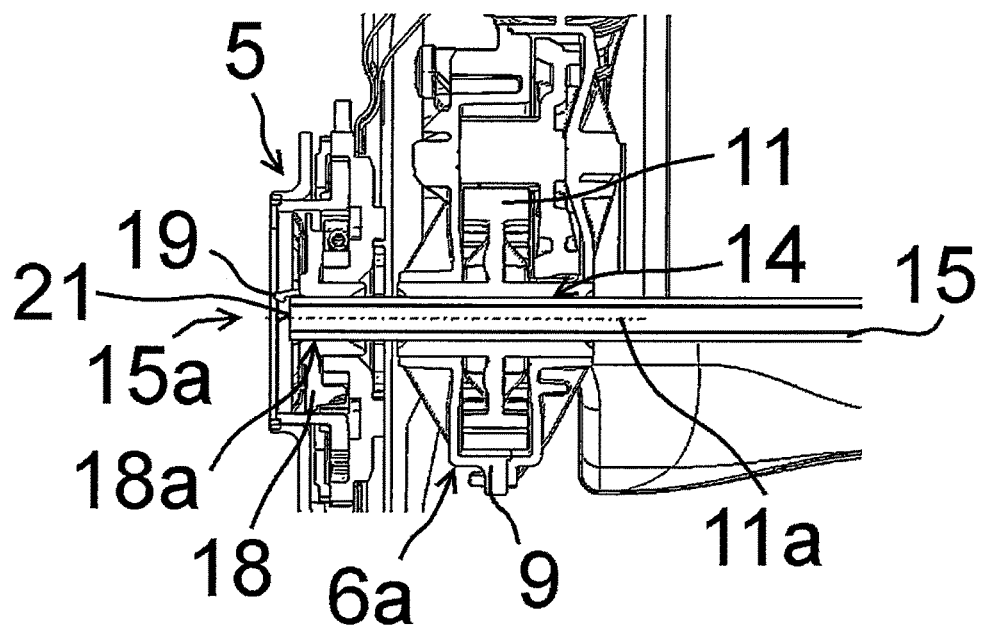
FIGS. 6a-6b are a series of views showing mounting steps for producing the adjustment arrangement.
Figure 6B:
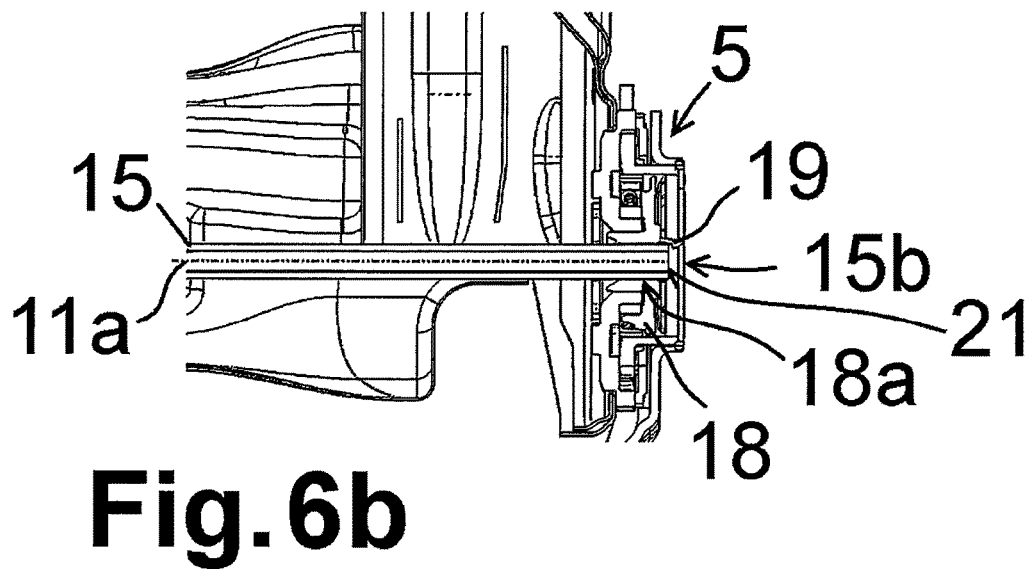
Figure 7:
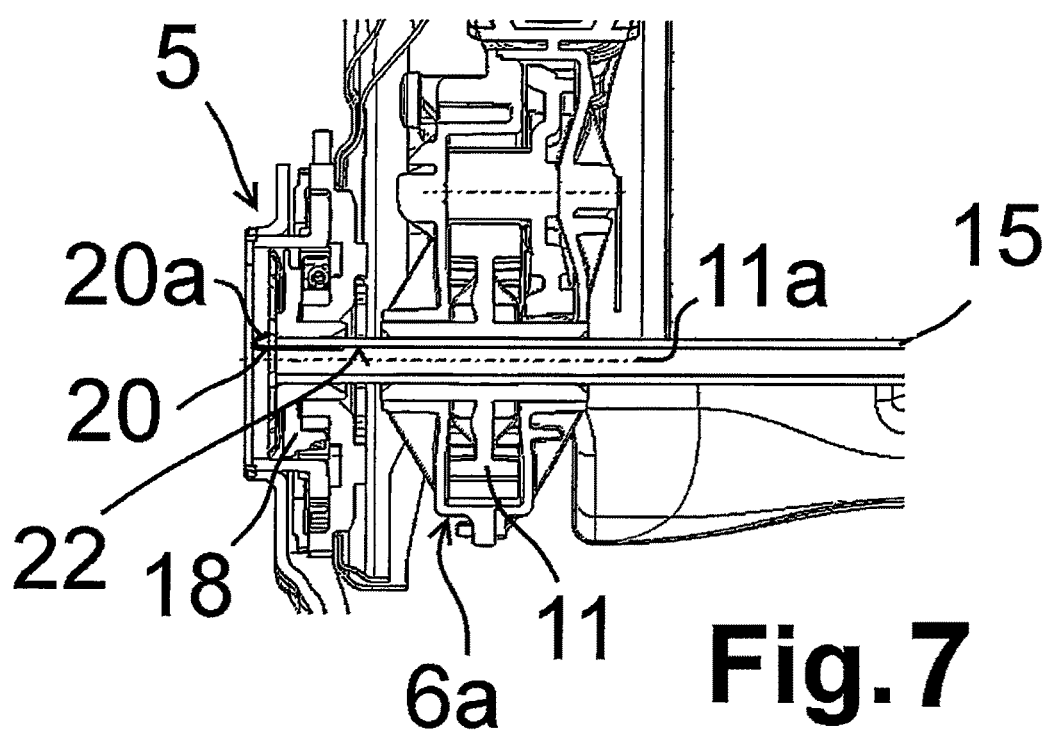
FIG. 7 is another view of the adjustment arrangement.

In order to ensure a secure reception of the transmission rod 15 in the adjusting mechanism 5, further adjusting latching elements 19, 20 may be provided, in addition or alternatively to the output latching element 12, the adjusting latching elements being shown in FIGS. 6 and 7 and also being designed as engaging latching elements.

According to a first embodiment shown in FIG. 6, a resilient flexible hook 19 is provided as a first adjusting latching element which is arranged in the region of the cuboidal through-opening 18a on the disk 18. To this end the hook 19 is produced, for example, integrally with the disk 18. From a specific lateral displacement of the transmission rod 15 in the cuboidal through-opening 18a, a front face 21 of the transmission rod 15 comes to bear against the resilient hook 19 and thus blocks further lateral slippage along the output axis 11a. A correspondingly designed resilient hook 19 is provided on the opposing side of the vehicle seat 1 on the opposing disk 18, the hook blocking a lateral displacement of the transmission rod 15 in the other direction.

According to a second embodiment shown in FIG. 7, a bent-back spring element 20 is provided as a second adjusting latching element, the bent-back spring element being fastened to an inner face 22 of the transmission rod 15, for example by spot welding. A bent-back part 20a of the spring element 20 is bent back outwardly, i.e. away from the output axis 11a, in the direction of the disk 18, such that with a lateral displacement the bent-back part 20a is pushed against the disk 18 and, as a result, a further lateral displacement along the output axis 11a is blocked. By a similarly designed second spring element 20 on the opposing side of the vehicle seat 1, a lateral displacement in the other direction is blocked in the same manner.

In both embodiments of the adjusting latching element 19, 20, only a small space requirement of about 1 mm outwardly for the laterally outwardly protruding hook 19 and/or the bent-back region 20a is required on the sides of the vehicle seat 1, so that the space requirement is kept small.

Thus by means of the latching elements 12, 19, 20, a type of latching function is formed by the lugs 13a engaging in the openings 17, the hook 19 being partially latched in front of the front face 21 of the transmission rod 15 and the bent-back part 20a being partially latched in front of a part fixed to the seat part—in this case the disk 18—and by means of this latching a lateral adjustment, i.e. a lateral movement of the transmission rod 15 relative to a component fixed to the seat part, for example the electrical drive device 6 or the adjusting mechanism 5, is blocked and/or considerably restricted.

Figure 8A:
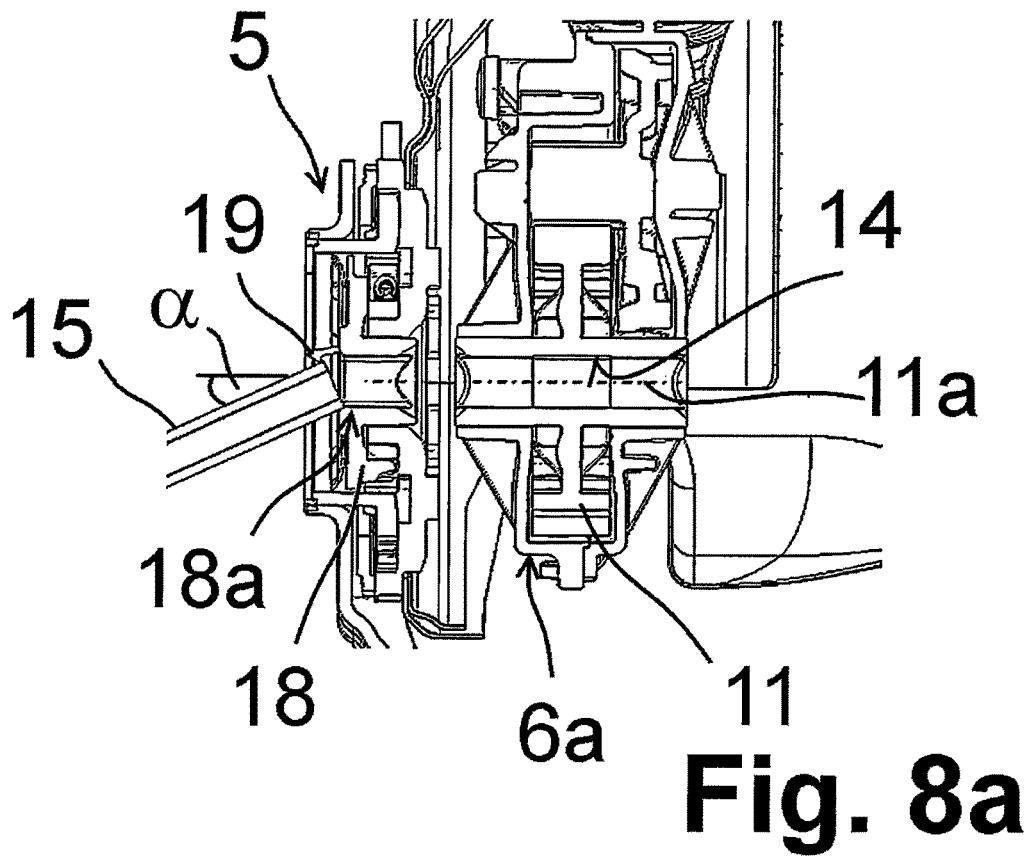
FIG. 8a is another view of the adjustment arrangement.
Figure 8B:
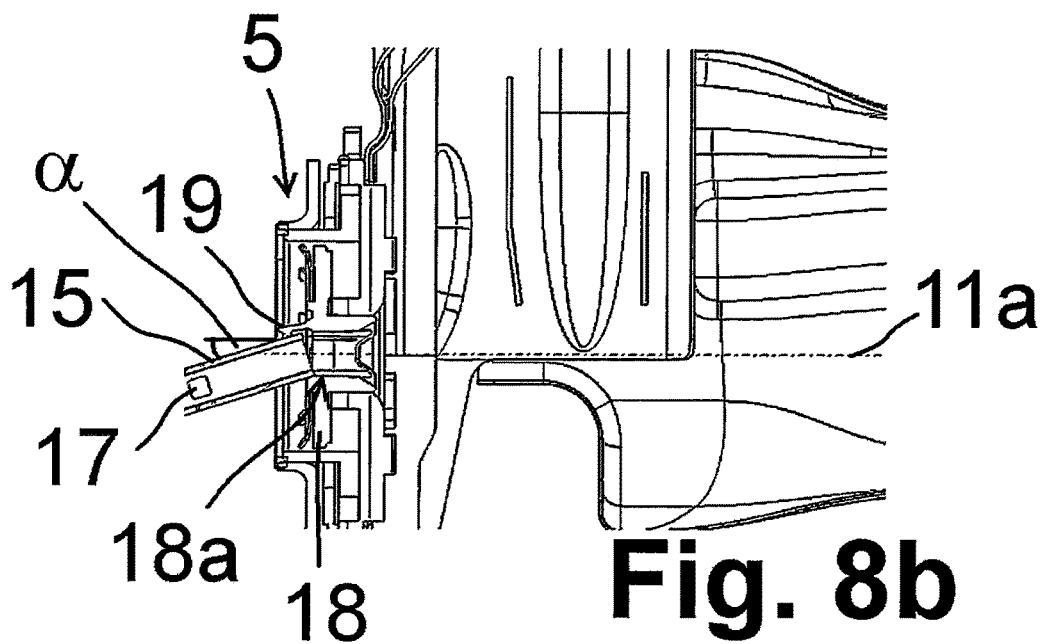
FIG. 8b is another view of the adjustment arrangement.

For mounting the transmission rod 15 in the embodiment shown in FIG. 6, according to FIG. 8 it is provided to tilt the transmission rod 15 initially by a mounting angle α relative to the output axis 11a and to position the transmission rod 15 onto the cuboidal through-opening 18a on one side. Subsequently, the transmission rod 15 is pushed upwardly until it is aligned with the output axis 11a. As a result, the resilient hook 19 is pushed upwardly on the one side of the vehicle seat 1. Subsequently, the transmission rod 15 is pushed through the cuboidal through-opening 18a and the cuboidal receiver 14 which is aligned therewith in the output gearwheel 11, until the transmission rod 15 on the opposing side of the vehicle seat 1 reaches the similarly cuboidal through-opening 18a and with the front face 21 is pushed against the hook 19 on the opposing side of the vehicle seat 1. At this time, the hook 19 engages on the one side of the vehicle seat 1 in its unstressed position, so that a lateral displacement is limited by both hooks 19. At the same time, the lug 13a on the output latching element 12 also engages in the openings 17 in the transmission rod 15. Thus a latching function is formed by three latching elements 12, 19, 20, a lateral displacement along the output axis 11a being blocked thereby.

Accordingly, the insertion of the transmission rod 15 may also take place by means of the bent-back spring elements 20, wherein the initial tilting may be dispensed with, since by the spring action of the bent-back spring element 20 the bent-back part 20a is automatically deformed and pushed inwardly when inserting the transmission rod 15 into the cuboidal through-opening 18a. The tilting, however, facilitates the insertion into the cuboidal through-opening 18a.

Electrical drive devices may be used for adjusting vehicle seat components, for example for the adjustment of the inclination of a backrest or for the longitudinal adjustment of the vehicle seat, the electrical drive devices, which are controlled by a control device, ensuring that a rotational movement is produced via a motor, the rotational movement being transmitted via additional gear components to a corresponding adjusting mechanism of the corresponding vehicle seat component.

One example of an adjustment arrangement used to transmit the rotational movement of the electrical drive device is via an output pinion to a toothed control plate. The toothed control plate is rotatably mounted on a seat surface fitting and directly connected to the adjusting mechanism on one side of the seat structure. To this end the control plate is rigidly coupled to a front rod of the adjusting mechanism so that with a rotation of the control plate the front rod is also adjusted, whereby for example the inclination of the vehicle seat may be altered via further coupling parts. Moreover, the control plate is fixedly connected to a transmission rod, the rotational movement of the output pinion also being able to be transmitted thereby to the opposing side of the seat structure in order to actuate at that point a further correspondingly designed part of the adjusting mechanism. A drawback of this adjustment mechanism is that a plurality of components are required for transmitting the rotational movement to both sides of the seat structure and for the secure mounting and retention of the transmission rod.

An adjustment arrangement in accordance with the present disclosure permits a simple and secure adjustment of a vehicle seat component using few components and the mounting effort thereof being able to be kept low. A method is also disclosed for the production thereof.

An adjustment arrangement in accordance with the present disclosure is provided for adjusting a vehicle seat component, for example a backrest of a vehicle seat, to arrange a rigid transmission rod which is connected fixedly in terms of rotation both to an output side of an electrical drive device and also to an adjusting mechanism, for example an inclination-adjusting mechanism, and which therefore provides an operative connection between the components, so that the adjusting mechanism may be actuated electrically via the drive device.

As a result, no further mechanical components which transmit a rotational movement of the electrical drive device to the transmission rod are required between an output side of the electrical drive device and the transmission rod. The rotational movement is thus transmitted directly, whereby material may be saved and the mounting effort may be kept low.

Moreover, latching elements are provided, the latching elements advantageously blocking a lateral displacement of the transmission rod, i.e. a displacement in the longitudinal direction of the transmission rod, wherein the latching elements may be arranged between the electrical drive device and the transmission rod and/or between the adjusting mechanism and the transmission rod. In this case, by means of resilient forces the latching elements cause the components of the respective latching element to be returned into their unstressed position, wherein a movement of the transmission rod relative to a component fixed to the seat part, for example the adjusting mechanism or the electrical drive device, is substantially blocked or considerably limited by this return. Only movements due to production tolerances are able to occur in the engaged position.

By the latching function, therefore, a component of the respective latching element provides an obstruction to the respective component fixed to the seat part or the transmission rod. In the assembled state of the adjustment arrangement, i.e. during operation of the vehicle seat, a lateral movement of the transmission rod relative to the seat part may be blocked thereby.

By the use of latching elements, the mounting effort may be minimized, because no screw connections or adhesively bonded connections are required in order to block an inadvertent lateral movement. Additionally, simpler dismantling may be permitted thereby, since the resilient flexible latching elements may be bent outwardly in order to block a lateral movement once again. Thus, the transmission rod may be mounted and dismantled repeatedly without great effort and without damage.

According to an advantageous development, it is provided to produce the latching element between the transmission rod and the electrical drive device, hereinafter denoted as the output latching element, integrally with an output gearwheel arranged on the output side of the electrical drive device. Thus, the output latching element is directly connected to a part of a gear mechanism of the electrical drive device, so that a rotational movement may be transmitted in a simple manner to the output latching element.

In one illustrative example, the output latching element comprises resilient projections and lugs arranged on the projections, wherein the lugs are oriented inwardly in the direction of an output axis, the output gearwheel and the transmission rod rotating about the axis. By the resilient action of the resilient projections, the lugs are pushed into openings in the transmission rod and engage therein when the transmission rod is received fixedly in terms of rotation in the electrical drive device in a corresponding position. By the engagement of the lugs in the openings, a lateral movement of the transmission rod along the output axis may be blocked during operation of the vehicle seat. Only with a resilient deformation of the projections is the transmission rod able to be displaced further as soon as the lugs are no longer arranged in the openings.

The output latching element in this case comprises four resilient projections having one respective lug, arranged offset to one another by approximately 90°, such that the lugs may be engaged in the transmission rod from four different sides, wherein one respective opening is also arranged relatively offset by 90° on the four sides of the transmission rod. As a result, a more secure engagement may be provided.

The torsional strength between the transmission rod and the adjusting mechanism is formed by a cuboidal through-opening in the adjusting mechanism and the torsional strength between the transmission rod and the output side of the electrical drive device is formed by a cuboidal receiver on the output side, wherein the cuboidal receiver is aligned with the cuboidal through-opening. A similarly cuboidal transmission rod is inserted into the cuboidal through-opening and the cuboidal receiver, so that by a rotational movement of the output side of the electrical drive device, the rotational movement may be transmitted to the transmission rod and subsequently to the respective adjusting mechanism. As a result, a transmission of the rotational movements may be ensured in a simple manner without costly fastening elements having to be used therefor.

The adjusting latching element, i.e. the latching element between the transmission rod and the adjusting mechanism, is configured by a resilient hook which is fixed to the seat part and which is arranged in the unstressed state such that with a lateral movement of the transmission rod along the output axis a front face of the transmission rod comes to bear against the hook. A further lateral movement of the transmission rod along the output axis may be blocked and/or considerably restricted thereby, since the hook of the transmission rod partially provides an obstruction. Only with a resilient deformation of the hook is the transmission rod able to be displaced further.

The hook is produced integrally with a disk transmitting the movement of the transmission rod to the adjusting mechanism, the cuboidal through-opening also being incorporated therein so that a simple and secure fastening of the adjusting latching element may be achieved.

According to another example, the adjusting latching element is configured by a bent-back spring element which is fixedly connected to the transmission rod. In the unstressed state of the spring element, a bent-back part of the spring element protrudes such that with a lateral movement of the transmission rod along the output axis the bent-back part comes to bear, for example, against the disk of the adjusting mechanism or a further component fixed to the seat part. A further lateral adjustment of the transmission rod along the output axis is blocked thereby. Only with a resilient deformation of the bent-back part is the transmission rod able to be displaced further.

It is provided in this case to fasten the bent-back spring element by spot welding to an inner face of the transmission rod, so that a simple and secure fastening of the adjusting latching element may be achieved.

The adjusting mechanism of the vehicle seat actuated by the adjustment arrangement is a height-adjustable mechanism for the adjustment of the height of the vehicle seat or a head restraint of the vehicle seat or an inclination-adjusting mechanism for adjusting the inclination of a seat part or a backrest of the vehicle seat.

The adjusting mechanism, in this case, is arranged on both sides in the vehicle seat and an actuation by the electrical drive device takes place by the transmission rod, such that one end of the transmission rod actuates the adjusting mechanism on one side of the vehicle seat and a second end of the transmission rod actuates the adjusting mechanism on the opposing side of the vehicle seat. Accordingly, the transmission rod is connected fixedly in terms of rotation to the electrical drive device and at the ends is connected in each case fixedly in terms of rotation to the two adjusting mechanisms. An adjusting latching element is also advantageously arranged on both adjusting mechanisms, the adjusting latching element blocking a lateral displacement of the transmission rod.

For producing an adjustment arrangement, after providing an adjusting mechanism with a cuboidal through-opening, for example on both sides of the vehicle seat, and an electrical drive device with a cuboidal receiver and an output latching element, it is provided to position a cuboidal transmission rod onto the cuboidal through-opening. The cuboidal transmission rod in this case is tilted by an angle relative to the output axis, wherein in this case the adjusting latching element is easily deformed and an insertion into the cuboidal through-opening is possible as a result.

If the cuboidal transmission rod is subsequently inserted into the cuboidal through-opening and the cuboidal receiver aligned therewith, the resilient projections of the output latching element are also deformed until the lugs engage in the openings in the transmission rod and the adjusting latching elements are transferred at the same time into the unstressed position. As a result, a lateral displacement of the transmission rod is blocked and the adjustment arrangement is complete.

The invention claimed is:

1. An adjustment arrangement for adjusting a vehicle seat component of a vehicle seat, the adjustment arrangement comprising
    an adjusting mechanism adapted to adjust a vehicle seat component and
    an electrical drive device connected operatively to the adjusting mechanism for electrical actuation of the adjusting mechanism,
    wherein an operative connection is formed by a transmission rod,
    wherein the transmission rod is connected fixedly in terms of rotation to the adjusting mechanism for transmitting a rotational movement about an output axis, transmitted from the electrical drive device to the transmission rod, to the adjusting mechanism,
    wherein the transmission rod is also connected fixedly in terms of rotation to an output side of the electrical drive device for the direct transmission of a rotational movement produced by the electrical drive device to the transmission rod,
    wherein a resilient adjusting latching element is arranged between the transmission rod and the adjusting mechanism and/or a resilient output latching element is arranged between the transmission rod and the output side of the electrical drive device for blocking a lateral movement of the transmission rod, which is received fixedly in terms of rotation, along the output axis, and
    wherein the output latching element comprises resilient projections and lugs arranged on the projections and the lugs are oriented inwardly in the direction of the output axis, such that by the resilient action of the resilient projections the lugs may be engaged in openings in the transmission rod received fixedly in terms of rotation on the output side in order to block a lateral movement of the transmission rod along the output axis.

2. The adjustment arrangement of claim 1, wherein the output latching element is integrally produced with an output gearwheel arranged on the output side of the electrical drive device.

3. The adjustment arrangement of claim 1, wherein the output latching element comprises four resilient projections arranged offset to one another by approximately 90°, such that the lugs may be engaged in the transmission rod from four different sides.

4. The adjustment arrangement of claim 3, wherein the torsional strength between the transmission rod and the adjusting mechanism is formed by a cuboidal through-opening in the adjusting mechanism, a cuboidal transmission rod being able to be inserted therein, and the torsional strength between the transmission rod and the output side is formed by a cuboidal receiver on the output side, a cuboidal transmission rod being able to be inserted therein.

5. The adjustment arrangement of claim 4, wherein the cuboidal receiver is aligned with the cuboidal through-opening.

6. The adjustment arrangement of claim 5, wherein the adjusting latching element is configured by a resilient hook which is fixed to the seat part and is arranged in the unstressed state, such that with a lateral movement of the transmission rod along the output axis, a front face of the transmission rod comes to bear against the hook for blocking a further lateral adjustment of the transmission rod along the output axis.

7. The adjustment arrangement of claim 6, wherein the hook is integrally produced with a disk transmitting the movement of the transmission rod to the adjusting mechanism.

8. The adjustment arrangement of claim 6, wherein the adjusting latching element is configured by a bent-back spring element which is fixedly connected to the transmission rod, wherein a bent-back part of the spring element protrudes in the unstressed state, such that with a lateral movement of the transmission rod along the output axis the bent-back part comes to bear against a component fixed to the seat part, for blocking a further lateral adjustment of the transmission rod along the output axis.

9. The adjustment arrangement of claim 8, wherein the bent-back spring element is fastened by spot welding to an inner face of the transmission rod and the bent-back part protrudes outwardly, viewed from the output axis.

10. The adjustment arrangement of claim 1, wherein in the vehicle seat, by means of the adjustment arrangement, adjusts at least one of a height-adjusting mechanism used to adjust a height of the vehicle seat, a head restraint of the vehicle seat, an inclination-adjusting mechanism for adjusting the inclination of a seat part and a backrest of the vehicle seat.

11. The adjustment arrangement of claim 10, wherein the adjusting mechanism is arranged on both sides in the vehicle seat and an actuation by the electrical drive device is able to be transmitted at the same time via the transmission rod to the adjusting mechanisms on both sides.

12. A method for producing an adjustment arrangement, the method comprising the steps of providing an adjusting mechanism in a vehicle seat with a cuboidal through-opening as well as an electrical drive device with a cuboidal receiver and an output latching element, wherein the cuboidal through-opening is aligned flush with the cuboidal receiver, positioning the cuboidal transmission rod onto the cuboidal through-opening and tilting the cuboidal transmission rod by an angle ($\alpha$) relative to the output axis by deforming the adjusting latching element, and inserting the cuboidal transmission rod into the cuboidal through-opening and the cuboidal receiver by deforming the resilient projections of the output latching element until lugs engage in the openings in the transmission rod and the adjusting latching elements are transferred into an unstressed position and a lateral displacement of the transmission rod is blocked as a result.

* * * * *